Jan. 30, 1940.  S. W. H. TURNER  2,188,744
MENU COURSE SELECTOR
Filed Oct. 10, 1939   2 Sheets-Sheet 1
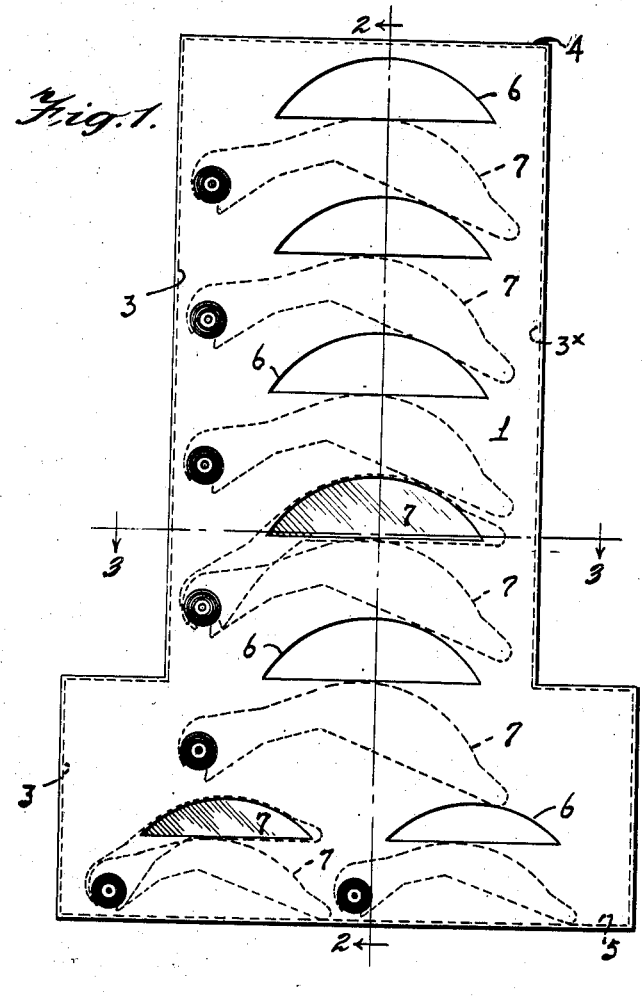
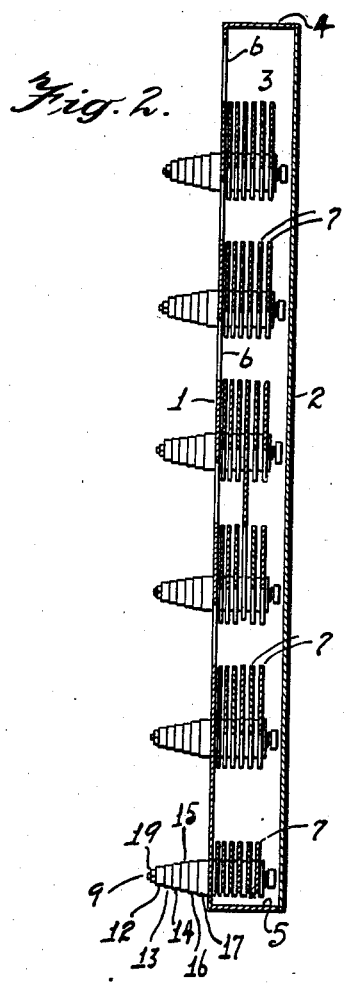
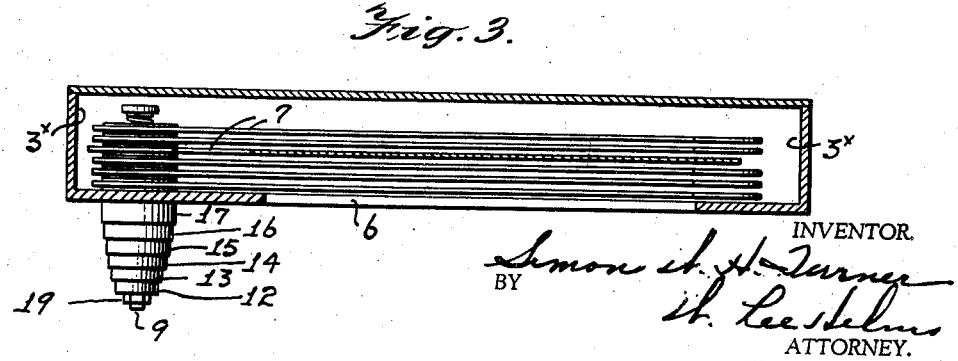
INVENTOR.
Simon W. H. Turner
BY
W. Lee Helms
ATTORNEY.

Jan. 30, 1940.  S. W. H. TURNER  2,188,744
MENU COURSE SELECTOR
Filed Oct. 10, 1939   2 Sheets-Sheet 2
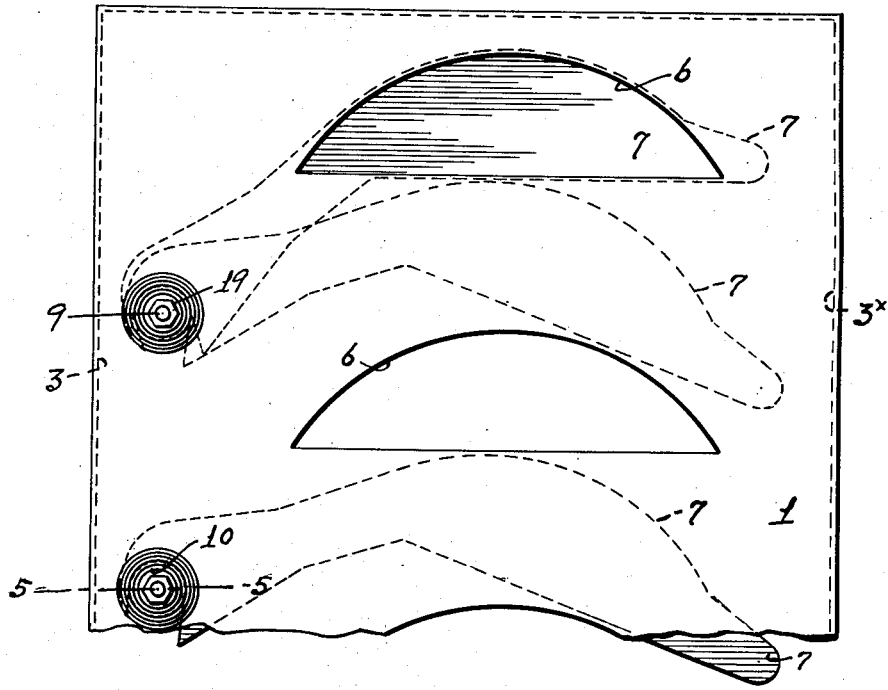
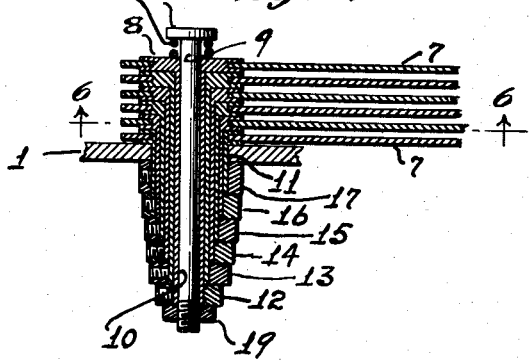
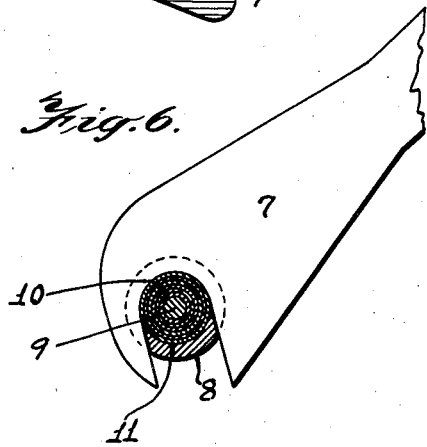
INVENTOR.
Simon W. H. Turner
BY
ATTORNEY.

Patented Jan. 30, 1940

2,188,744

UNITED STATES PATENT OFFICE 2,188,744

MENU COURSE SELECTOR

Simon W. H. Turner, New York, N. Y.

Application October 10, 1939, Serial No. 298,772

4 Claims. (Cl. 40—67)

The object of the present invention is to provide a device by means of which any one of a plurality of movable carriers arranged in a plurality of sets and normally hidden, marked on its face with the appropriate items of a given course of a dinner or luncheon, for example, may be moved to visible position to guide a chef, cook or housewife in the determination of the appropriate items of the course, so that each course may be accompanied with appropriate balance.

By means of my device, the display elements may be many in number and, at the same time, associate in very compact relationship and in such manner as to be selected and thrown into visual position with ease and rapidity.

Further objects of the invention will appear with respect to the description of the accompanying drawings, in which:

Figure 1 is a view in front elevation illustrating an embodiment of the invention.

Figure 2 is a transverse vertical section on the line 2—2, Figure 1.

Figure 3 is a horizontal section on the line 3—3, Figure 1.

Figure 4 is a fragmentary and enlarged view showing the upper portion of the device.

Figure 5 is an enlarged horizontal section taken on the line 5—5, Figure 4.

Figure 6 is a vertical section taken on the line 6—6, Figure 5.

The structure of my device will now be described:

I have shown a casing which may, at its base, be enlarged to form a section adapted to rest upon a table or other suitable support. The casing may be provided with a front wall 1 and a rear wall 2 connected at their ends with side plates 3, 3x, the top and bottom being closed by walls 4 and 5 respectively. If desired, side plates 3 may be hinged or removable so as to afford access to certain of the movable parts as later to be described.

The front plate 1 is provided with a plurality of sight apertures, seven in the present embodiment, these apertures being indicated at 6. The apertures may be of any suitable form, those shown in the drawing being segmental in contour. Below each aperture I position a set of movable display carriers each provided with its own manual control member by means of which an appropriate display plate may be moved into and out of display position.

As shown more particularly in Figures 4 to 6 inclusive, each display plate comprises a relatively thin but rigid plate, preferably removable from a rotary support. Hence, each display plate 7 at its rear end is cut away along generally U-shaped lines to form an open channel, the edges of which may frictionally engage the rotatable carrier.

Each rotatable carrier comprises a disk or wheel 8, preferably formed with a peripheral channel or groove. Thus when the channel end of a display plate 7 is placed in register with the groove of its appropriate rotatable carrier the plate may be pressed downward into such position as to exert frictional pressure upon the wheels of the carrier channel and the plate may be held by frictional pressure exerted between the carrier and the edges of the plate channel and between the sides of the plate and the faces of the rotary carrier channel.

It will be seen that all of the display plates of a set are mounted upon abutting rotary carriers which rotate about a common shaft.

Referring to Figure 5, it will be seen that the shaft common to the set of plates 7 shown in that figure, is shown at 9. The innermost display plate 7, relatively to casing wall 1, is carried by a sleeve 10, and each succeeding rotary disk is mounted upon its own sleeve so that the second carrier disk has a sleeve mounted upon the sleeve for the first carrier disk and so on until the outermost sleeve 11 is reached. From the sleeve 10 to the sleeve 11 the successive sleeves are progressively shorter in length. Upon each sleeve is mounted a knurled thumb wheel, the thumb wheels being indicated at 12, 13, 14, 15, 16, 17, Figure 5.

Shaft 9 may be formed with a head 9x which abuts a light spring 18 surrounding the shaft so that when a nut 19 threaded on the opposite end of the shaft is rotated, tension will be imparted to the spring and frictional pressure will be exerted upon the rotary carrier disks for the display plates and in such manner that when a display plate is moved into display position it will be frictionally held in such position by a light, but adequate, frictional pressure upon an adjacent carrier disk. Each of the thumb wheels 12 to 17 inclusive, may be removably held upon its appropriate carrier sleeve by a set screw such as indicated at 20, Figure 5.

The thumb wheels which control the position of each display plate of a set may be of the same exterior diameter, but I prefer that they be progressively decreased in diameter for convenience of manipulation, as indicated more particularly in Figures 2, 3 and 5 of the drawings.

Now taking the successive sets of display plates in their order from top to bottom, it may be considered, for example, that the top set relate to one of the first courses, to wit, soups. Each of the thumb wheels 12 to 17 inclusive may be marked to designate a particular soup which will represent a class of soups having its general characteristics. Thus, one thumb wheel will designate a thick soup, another a thin soup, etc. For example, thumb wheel 17 may be marked "Bisques" or "Bisques and thick soups." When that thumb wheel is turned to expose its plate, there will be thrown into display all of the elements of the particular course having the thin soup, say, chicken consommé, as its basis. Thus the display plate may be marked CHICKEN CONSOMMÉ
        Celery
        Olives
        Melba toast
        Toasted crackers It will also be understood that, if desired, one or more of the display plates may be marked with a plurality of selections for the particular course.

The second set of display plates may cover the favored or commonly used entree courses and each of the thumb wheels of said set of plates may be appropriately marked, as, for example,

ENTREE—COLD FISH
        ENTREE—HOT FISH etc., and, as an example of the class of cold fish entrees, the appropriate plate may be marked HALIBUT
        Hollandaise sauce
        Marinated cucumbers A hot fish entree, representative of the class, may be marked on a second of the said series of display plates, as, for example BROILED POMPANO
        Drawn butter sauce
        Potato roses
        Cold sliced tomatoes The third set of display plates may be marked with six representative roast courses, for example, the thumb wheel for one of the plates may be marked

HOT LAMB DISHES and the plate itself may have such courses marked thereon as, for example, LAMB IMPERIAL
        Mint jelly
        Green peas
        Potatoes natural
        Rolls
        Toast The fourth set of plates may cover the more commonly used game courses and the initial plate, for example, may be marked BRAISED GROUSE
        Maitre d'hotel sauce
        Macaroni timbales
        New okra
        Creole yams
        French bread
        Toast The fifth set of display plates may cover the six most commonly used salads in course dinners and the desirable accompanying items for each salad course.

The final two sets of display plates will cover the twelve desserts considered most desirable with course dinners and the appropriate accompanying items for each dessert, making up the complete desired course in each case.

It will be understood that the display plates may be constructed of any suitable material. In practice, I have found aluminum sheet to be a suitable material. It will satisfactorily take printing or lithographing. However, it may be found desirable to print a sheet to be removably carried by each plate so that the printed text for any one plate may conveniently be changed at will. In this connection, the sheet may be shaped to conform with that area of the plate which is exposed by the appropriate window or may be clipped or connected to the plate in any suitable manner. If desired, a folded sheet may be employed so that the line of fold will meet an edge of the plate and the two fold sections may be clipped together over upon the plate.

By means of the invention, specific selections of daily menus for the home, also for restaurants and hotels may be accomplished through the use of a permanent and durable device, which will accurately designate the proper items to serve with different courses in simple meals as well as with the most exacting formal dinners or luncheons.

In the serving of a large formal dinner, as in an hotel where the kitchen is controlled by a chef and the service by the steward, two of the devices each having the appropriate displays raised to cover the courses of the entire dinner would be employed, one for the chef and one for the steward. When the first course is passed from the kitchen to the dining room the chef will lower the plate covering that course and the steward will follow when the course leaves his hands to the waiting staff, and this operation will successively be followed as a check to the appropriate and complete service until the serving of the dinner has been completed.

Having described my invention, what I claim and desire to secure by Letters Patent, is as follows:

1. A menu course selector comprising a facing plate formed with a plurality of display openings, a set of display plates arranged face to face adjacent each display opening, means rotatable about a common axis and comprising a plurality of elements each adapted to impart movement to one of the display plates into and out of register with an appropriate display opening, and frictional means for holding each plate in position after an actuation thereof.

2. A menu course selector comprising a facing plate formed with a plurality of display openings, a set of display plates comprising plates normally arranged face to face adjacent an opening, a carrier for each plate, said carrier comprising a rotatable disk upon which the plate is mounted, a plurality of sleeve shafts mounted one upon the other so as to have a common axis, a thumb wheel for each shaft, the thumb wheels being disposed exteriorly of the facing plate, and means for imparting a frictional pressure upon the carrier disks whereby actuation of a plate through its thumb wheel, carrying the plate to a predetermined position, will result in maintenance of the plate in said position through said frictional pressure.

3. A menu course selector comprising a facing plate formed with a plurality of display apertures, a set of display plates for each aperture and normally hidden by the facing plate, the display plates of each set being normally positioned in face to face relationship, a carrier for each display plate of a set, the carriers for said set comprising disks formed with channeled peripheries, each display plate near one end being formed with a hook-like end adapted to engage the channel of one of said disks, whereby the display plate is removably held, and means exterior the facing plate comprising a plurality of independently movable elements, each element being operatively connected to one of said channel disks for moving its display plate into and out of operative register with the appropriate display aperture.

4. A menu course selector constructed in accordance with claim 3, in which each channeled disk is carried upon a sleeve projecting exteriorly of the facing plate, the sleeves for the set of channeled disks being mounted one upon the other, a shaft passing through the innermost sleeve, means carried by the shaft for imparting frictional pressure upon the channeled disks of a set of disks, and a thumb wheel carried by each sleeve for manually actuating one of the channeled disks and the display plate carried thereby.

SIMON W. H. TURNER.